UNITED STATES PATENT OFFICE.

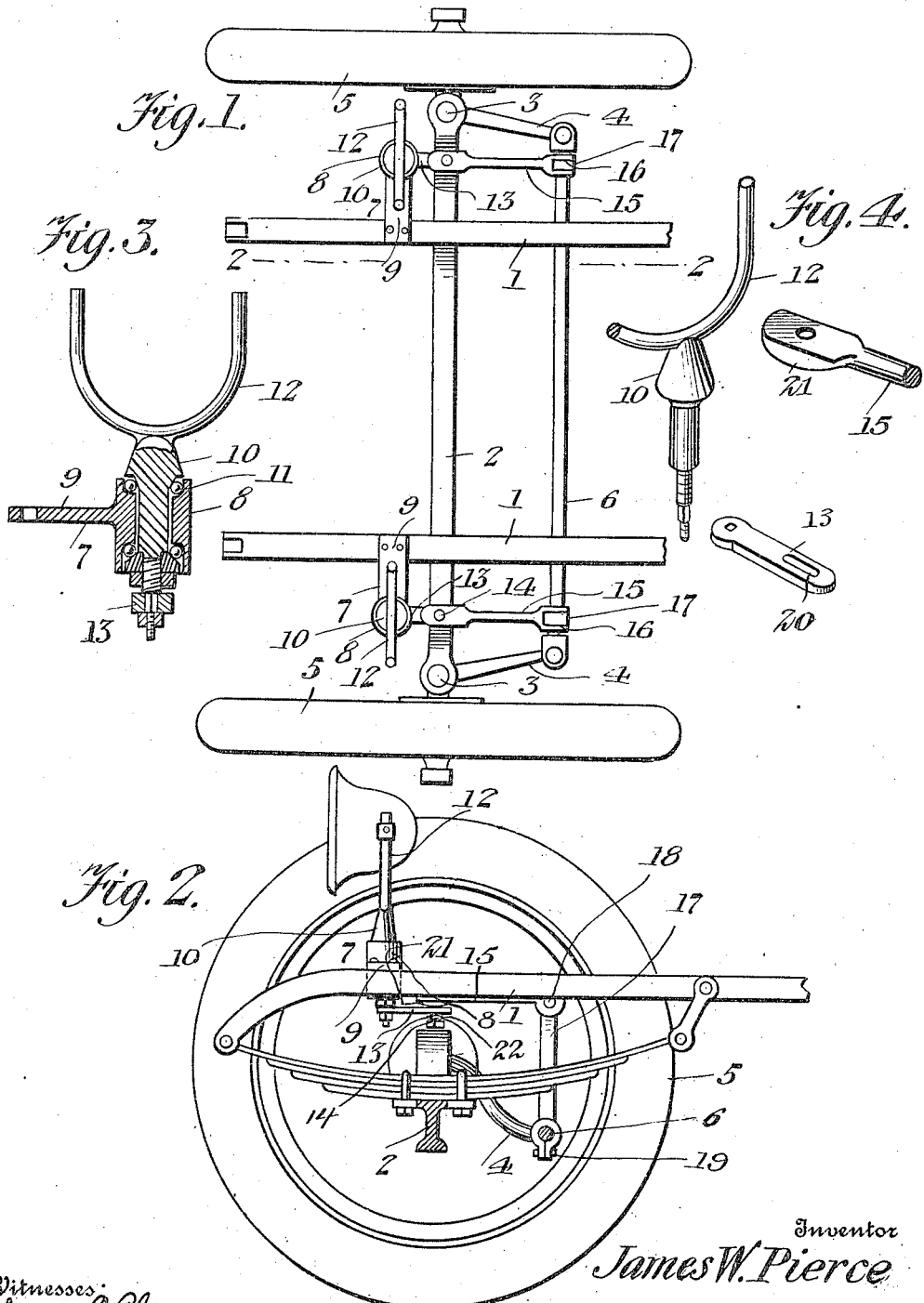

JAMES W. PIERCE, OF DARBY, MONTANA.

HEAD-LAMP CONTROL.

1,237,951.　　　　Specification of Letters Patent.　　Patented Aug. 21, 1917.

Application filed January 4, 1916. Serial No. 70,086.

*To all whom it may concern:*

Be it known that I, JAMES W. PIERCE, a citizen of the United States, residing at Darby, in the county of Ravalli and State of Montana, have invented new and useful Improvements in Head-Lamp Controls, of which the following is a specification.

This invention relates to headlamp controls, the object in view being to provide novel mechanism whereby the head lamps of an automobile will be automatically swung to one side or the other in accordance with the angle assumed by the front steering wheels of an automobile or similar vehicle thereby illuminating that portion of the road way which is about to be followed by the machine, enabling bends or curves ahead of the machine to be fully illuminated by the lamps. The mechanism embodies means whereby in addition to the swinging movement of the head lamps, provision is made for taking care of the relative up and down movements of the body and frame of the machine in relation to the axles thereby preventing any cramping or binding of the mechanism controlling the head lamps.

With the above and other objects in view, the invention consists in the novel construction, combination and arrangement of parts, as herein described, illustrated and claimed.

In the accompanying drawings:—

Figure 1 is a plan view of the front portion of an automobile frame, omitting the body to show the application of the present invention thereto.

Fig. 2 is a fore and aft vertical section on the line 2—2 of Fig. 1 showing the connections between one of the lamp posts and the steering arm connecting rod.

Fig. 3 is a view partly in elevation and partly in section showing one of the lamp post brackets, the relation of the lamp post thereto and the relation of the bracket to the frame.

Fig. 4 is a detail perspective view of the connections between one of the lamp posts and the steering arm connecting rod.

Referring to the drawings 1 designates the side frame bars of the chassis or frame of an automobile, 2 the front axle, 3 the steering knuckles, 4 the steering arms thereof and 5 the steering wheels of the machine, all of said parts being of the usual construction and arrangement and the knuckle arms being coupled together by the usual connecting rod 6.

In carrying out the present invention, I provide a pair of lamp post supporting brackets 7 each embodying a sleeve 8 and a laterally projecting arm 9 by means of which said sleeve and bracket are secured to the adjacent side bar in fixed relation to the latter. The lamp post 10 has the lower end thereof reduced and journaled on ball bearings 11 within the sleeve 8 and provided with a shoulder or nut at the lower end thereof which prevents the upward escape of the lamp post. Each post is shown as provided with the usual lamp carrying fork 12 at the upper end thereof. Extending rearwardly from and having a fixed relation to each lamp post is a lamp turning arm 13 and connected thereto by a vertical pivot 14 is a link 15 the rear end of which is bifurcated or slotted as shown at 16 to embrace the upper extremity of an arm 17, being connected thereto by a horizontal pivot 18. The lower end of the arm 17 is split so as to embrace the connecting rod 6, being firmly clamped thereto by means of a bolt or screw 19 which enables the arm 17 to be adjusted along the rod 6 until it is brought to the desired point in order to secure an accurate swinging movement of the lamp controlled thereby and cause said lamp to project the rays of light at an angle corresponding with the angle assumed by the steering wheels.

From the foregoing description, taken in connection with the accompanying drawings it will now be understood that when the operator turns the steering wheels to one side or the other by means of the usual hand controlled wheel, steering rod and the connecting rod 6 which couples the steering knuckles together, the arms 17 are moved pivotally in a corresponding direction carrying with them the links 15 which are also moved pivotally with the arms 17 and operate to swing the rear extremities of the arms 13 to turn the lamp posts and the lamps carried thereby. In such movement, the links 15 always extend in a fore and aft direction but in order to accommodate the up and down movements of the vehicle body, the horizontal pivots 18 are provided as the lamps are fastened to the frame of the machine while the connecting rod 6 always maintains the same relation to the axle and therefore is incapable of any up and down movement. The arms 13 are formed with slots 20 to receive the pivots 14 in order that there may be no binding or cramping between the arms 13 and the links 15 when the steering wheels are turned to their limit in either direction. Each link 15 is also formed with a rocker face 21 to allow for the rocking movement of said link under the action of the front springs.

Where each link 15 connects with the respective arm 13, the link is operated with a rocker face 21 to provide for up and down movement between the frame of the vehicle and the front axle. A coiled spring 22 surrounds the pivot 14 below the arm 13, said pivot extending through a hole in the link 13 and also through the slot 20 in the arm 13. This allows for the necessary rocking motion of the link 15 and further allows for a relative sliding as well as pivotal movement between the link 15 and the arm 13. The relative up and down movement of the vehicle frame in relation to the axle and the connecting rod 6 is thus provided for, preventing bending of any of the parts of the lamp turning mechanism due to such movement of the vehicle body.

Having thus described my invention, I claim:—

The combination with the steering mechanism of a motor vehicle, of arms extending upwardly from the steering knuckle arm connecting rod and fastened to said rod, headlamps journaled on substantially vertical axes on the vehicle frame, lamp turning arms extending horizontally from said posts and provided with longitudinal slots, pivotal links connected by horizontal pivots to the first named arms and provided at their opposite ends with rocker faces which work in contact with the respective lamp turning arms, vertical pivots extending through the contacting end portions of the links and lamp turning arms, and springs encircling the last named pivots and yieldingly holding the rocker faces of the end portions of the links in contact with the lamp turning arms.

In testimony whereof I affix my signature in presence of two witnesses.

JAMES W. PIERCE.

Witnesses:
SEVER THOMPSON,
JESSE C. PICKRELL.

Copies of this patent may be obtained for five cents each, by addressing the "Commissioner of Patents, Washington, D. C."